(12) United States Patent
Savu et al.

(10) Patent No.: US 7,572,848 B2
(45) Date of Patent: Aug. 11, 2009

(54) COATABLE COMPOSITION

(75) Inventors: Patricia M. Savu, Maplewood, MN (US); Michael J. Parent, Davenport, IA (US); William M. Lamanna, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 548 days.

(21) Appl. No.: 11/275,269

(22) Filed: Dec. 21, 2005

(65) Prior Publication Data

US 2007/0142512 A1    Jun. 21, 2007

(51) Int. Cl.
C08K 5/42 (2006.01)
C08K 5/43 (2006.01)

(52) U.S. Cl. ............... 524/157; 524/19; 524/168; 524/173; 524/186; 524/379; 524/381; 524/556; 524/598

(58) Field of Classification Search ............ 524/168
See application file for complete search history.

(56) References Cited

U.S. PATENT DOCUMENTS

| | | | |
|---|---|---|---|
| 2,519,983 A | 8/1950 | Simons | |
| 4,321,404 A | 3/1982 | Williams et al. | |
| 4,359,096 A | 11/1982 | Berger | |
| 4,484,990 A | 11/1984 | Bultman et al. | |
| 4,533,713 A | 8/1985 | Howells | |
| 4,830,910 A | 5/1989 | Larson | |
| 5,207,996 A | 5/1993 | Sierakowski et al. | |
| 5,912,298 A * | 6/1999 | Gomi et al. | 524/591 |
| 6,043,209 A * | 3/2000 | Micciche et al. | 510/280 |
| 6,664,329 B2 | 12/2003 | Gwin et al. | |
| 6,664,354 B2 | 12/2003 | Savu et al. | |
| 6,727,309 B1 | 4/2004 | Paiva et al. | |
| 6,824,945 B2 * | 11/2004 | Emoto et al. | 430/137.15 |
| 6,890,452 B2 | 5/2005 | Parent et al. | |
| 7,294,610 B2 * | 11/2007 | Savu et al. | 510/175 |
| 2003/0139549 A1 | 7/2003 | Savu et al. | |
| 2004/0094510 A1 | 5/2004 | Parent et al. | |
| 2005/0181620 A1 | 8/2005 | Parent et al. | |
| 2005/0197273 A1 | 9/2005 | Savu et al. | |
| 2007/0049646 A1 * | 3/2007 | Moore et al. | 516/201 |

OTHER PUBLICATIONS

Kissa, "Fluorinated Surfactants—Synthesis-Properties-Applications, Chapter 8 Applications", Marcel Dekker, Inc., New York, 1994, pp. 325-327, 343.
Overdiep, "The Levelling of Paints", Progress in Organic Coatings, 1986, vol. 14, pp. 159-175.
Weidner et al., "Role of Surface Tension Gradients in Correcting Coating Defects in Corners", Journal of Colloid and Interface Science, 1996, vol. 179, pp. 66-75.
R.E. Banks, Editor, Abe et al., "Preparation, Properties, and Industrial Applications of Organofluorine Compounds", Ellis Horwood Ltd., John Wiley & Sons, 1982, Chapter 1, pp. 19-43.
Tarant, Editor, Nagase, "Fluorine Chemistry Reviews", vol. 1, Marcel Dekker, Inc., New York, 1967, pp. 77-106.
US 6,492,477, 12/2002, Savu et al. (withdrawn)

* cited by examiner

*Primary Examiner*—Marc S. Zimmer
*Assistant Examiner*—Nicole M Buie
(74) *Attorney, Agent, or Firm*—Bradford B. Wright

(57) ABSTRACT

A coatable composition that comprises water, a film-forming organic polymer, and a leveling agent comprising an anionic species represented by the formula

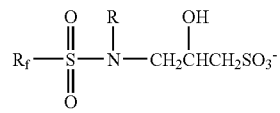

wherein $R_f$ represents a perfluoroalkyl group having from 4 to 6 carbon atoms, and R represents H or an alkyl group having from 1 to 18 carbon atoms.

11 Claims, No Drawings

COATABLE COMPOSITION

BACKGROUND

In general, the ability of a surfactant to lower the surface tension of a solvent or formulation has little predictive value to determine where that surfactant would be useful as leveling agents to prevent coating defects. To prevent coating defects a surfactant only has to lower the surface energy of a formulation on drying only marginally, but in order to prevent coating defects such as orange peel or cratering (i.e., formation of surface blemishes in a freshly coated surface, usually in the form of small round patches), it should be capable of maintaining that surface energy at a nearly constant value during drying. However, drying behavior of a two component system of resin and solvent may lead to surface gradients in surfactant that is present as reported, for example, by D. E. Weidner in "Role of Surface Tension Gradients in Correcting Coating Defects in Corners" in *Journal Of Colloid And Interface Science*, vol. 179, pp 66-75 (1996). For example, FIG. 10 of that paper reports that under some circumstances weaker surfactants may result in coatings with greater thickness at the edges, and hence more level, than if stronger surfactants are used.

Hence, in Edisonian fashion, one is ultimately left with the option of empirically evaluating different surfactants in order to determine which might be effective in certain types of formulations.

SUMMARY

In one aspect, the present invention provides a coatable composition comprising: water, a film-forming organic polymer, and a leveling agent comprising an anionic species represented by the formula

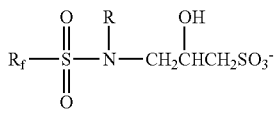

wherein $R_f$ represents a perfluoroalkyl group having from 4 to 6 carbon atoms, and R represents H or an alkyl group having from 1 to 18 carbon atoms.

In some embodiments, the coatable composition further comprises wax or pigment.

Coatable compositions according to the present invention exhibit desirable wetting and leveling behavior, upon coating on a substrate and drying, that typically results in dried coatings with an aesthetically pleasing appearance (e.g., minimal coating defects).

In this application:

all numerical ranges (for example, 4 to 6 carbon atoms) shall be considered inclusive of their endpoints unless otherwise explicitly stated;

the term "film-forming organic polymer" refers to a waterborne organic polymer that will uniformly coalesce upon drying;

the term "waterborne" means dissolved or dispersed in a liquid material containing water and optionally water-soluble organic solvent; and the term "water-soluble" means at least partially soluble in liquid water.

DETAILED DESCRIPTION

Coatable compositions according to the present invention comprise water, a film-forming organic polymer, and a leveling agent.

While coatable compositions according to the present invention may have the film-forming organic polymer dissolved or dispersed solely in water, water-soluble organic solvents may optionally be combined with the water, for example, to facilitate uniform drying and or film-formation.

Examples of water-soluble organic solvents include alcohols containing 1 to 4 carbon atoms such as, for example, methanol, ethanol, isopropanol, and isobutanol; amides and lactams such as, for example, N,N-dimethylformamide, N,N-dimethylacetamide, and N-methylpyrrolidone; ketones and ketoalcohols such as, for example, acetone, cyclohexanone, methyl isobutyl ketone, diacetone alcohol; ethers such as, for example, tetrahydrofuran, dioxane, and lower alkyl ethers of polyhydric alcohol such as ethylene glycol monomethyl (or monoethyl) ether, diethylene glycol methyl (or ethyl) ether, and triethylene glycol monomethyl (or monoethyl) ether; alkylene glycols and polyalkylene glycols such as, for example, ethylene glycol, propylene glycol, butylene glycol, triethylene glycol, hexylene glycol, diethylene glycol, polyethylene glycol, polypropylene glycol; 1,3-dimethyl-2-imidazolidinone; and combinations thereof.

Typically, the amount of water and optional water-soluble organic solvent in the coatable compositions will be in a range of from 40 to 99 percent by weight, based on the total weight of the coatable composition, however other amounts may also be used.

Film-forming polymers suitable for use in the compositions of the invention are generally thermoplastic organic polymers containing carbon and hydrogen and optionally oxygen, nitrogen and/or halogen. Examples of suitable polymers include: polyesters, for example, polyethylene terephthalate or polycaprolactone; copolyesters, for example, polyethylene terephthalate isophthalate; polyamides, for example, polyhexamethylene adipamide; vinyl polymers, for example, poly(vinyl acetate/methyl acrylate), poly(vinylidene chloride/vinyl acetate); polyolefins, for example, polystyrene and copolymers of styrene with acrylate(s) such as, for example, poly(styrene-co-butyl acrylate); polydienes, for example, poly(butadiene/styrene); acrylic polymers, for example, poly(methyl methacrylate-co-ethyl acrylate), poly (methyl acrylate-co-acrylic acid); polyurethanes, for example, reaction products of aliphatic, cycloaliphatic or aromatic diisocyanates with polyester glycols or polyether glycols; and cellulosic derivatives, for example, cellulose ethers such as ethyl cellulose esters such as cellulose acetate/butyrate. Combinations of film-forming polymers may also be used. Methods and materials for preparing aqueous emulsions or latexes of such polymers are well known, and many are widely available from commercial sources.

One or more film-forming polymers may be present, for example, as an emulsion or latex. Typically, the amount of film-forming polymer(s) is in a range of from 1 to 40 percent by weight, based on the total weight of the coatable composition, however other amounts may also be used.

In addition to the optional organic solvent, coatable compositions according to the present invention may also include one or more plasticizers, coating aids, anti-foaming agents, polymer emulsions, crosslinking agents, waxes, pigments, light stabilizers, inorganic fillers, or a combination thereof.

The leveling agent comprises an anionic species represented by the formula

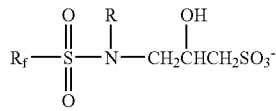

wherein, $R_f$ represents a perfluoroalkyl group having from 4 to 6 carbon atoms, and R represents H or an alkyl group having from 1 to 18 carbon atoms (e.g., methyl, ethyl, isobutyl, hexyl, octyl, isooctyl, dodecyl, or octadecyl). For example, R may represents an alkyl group having from 1 to 8 carbon atoms, or even 6 to 8 carbon atoms. Generally, the leveling agent is accompanied by a stoichiometrically equivalent quantity of cationic species that balances the overall charge of the composition. Examples of suitable cationic counter ions include: inorganic cations such as, for example, $H^+$, and alkali metal cations (for example, $Li^+$, $N^+$, $K^+$), alkaline earth metal cations, transition metal cations, and $NH_4^+$; organic cations such as, for example, onium cations such as primary, secondary, tertiary or quaternary ammonium cations, sulfonium cations, phosphonium cations; and combinations thereof.

Typically, the amount of leveling agent in the coatable composition will be in a range of from 0.1 parts per million by weight to 1 percent by weight, more typically, in a range of from 0.5 to 1000 parts per million by weight, however other amounts may also be used.

In some embodiments, such as, for example, those wherein the coatable composition further comprises wax, the coatable compositions may be used to provide buffable finishes that may be suitable for use as a floor finish or as a motor vehicle or marine finish. In such embodiments, the film-forming polymer typically has at least one, more typically a plurality, of pendant cross-linkable groups (e.g., $-CO_2H$ or $-CO_2^-$, $-NH_2$, and/or $-CH_2OH$), and one or more metal complexing agents (e.g., $Zn^{2+}$, $Ca^{2+}$, $Ti^{4+}$), typically present as an ammine. Further details concerning surface finishes may be found in, for example, U.S. Pat. No. 6,727,309 (Paiva et al.) and U.S. Pat. No. 6,664,329 (Gwin et al.).

In some embodiments, the coatable composition may further comprise at least one crosslinking agent for the organic polymer. Examples include polyvalent metal cations such as, for example, those metal complexing agents listed hereinabove as well as $Mg^{2+}$, $Zr^{4+}$, or $Al^{3+}$ cations, borates, polyalkoxysilanes, and polyaziridines.

In some embodiments, the coatable composition may comprise on or more colorants such as for example, dyes or pigments. Such coatable compositions may be used as paint.

Coatable compositions according to the present invention may typically be prepared by simple mixing of the component parts by techniques that are well known in the art.

Coatable compositions according to the present invention may be coated by any method such as, for example, brushing, mopping, bar coating, spraying, dip coating, gravure coating, and roll coating.

Objects and advantages of this invention are further illustrated by the following non-limiting examples, but the particular materials and amounts thereof recited in these examples, as well as other conditions and, details, should not be construed to unduly limit this invention.

EXAMPLES

Unless otherwise noted, all parts, percentages, ratios, etc. in the examples and the rest of the specification are by weight, and solvents and reagents used in the examples were obtained, or are available, from general chemical suppliers such as, for example, Sigma-Aldrich Company, Saint Louis, Missouri, or may be synthesized by conventional methods.

In the examples the term "$C_4F_9$" refers to a mixture of 96 parts $-CF_2CF_2CF_2CF_3$, 2 parts $-CF_2CF(CF_3)CF_3$, 2 parts $-CF_2CF(CF_3)CF_3$, and 1-3 parts $-CF_2CF_2CF_2CF_2H$.

Perfluorobutanesulfonyl fluoride ($C_4F_9SO_2F$) was prepared by Simons Electrochemical fluorination (ECF). An early patent describing such technology is U.S. Pat. No. 2,519,953 (Simons). ECF by the Simons process is also described by S. Nagase in *Fluorine Chemistry Reviews*, vol. 1 (1), pp 77-106 (1967), and by T. Abe et al in Chapter 1 of *Preparation, Properties, and Industrial Applications of Organofluorine Compounds*, R. E. Banks, Editor, Ellis Horwood Ltd., Hoisted Press (1982).

Preparation of $C_4F_9SO_2NH(CH_2)_5CH_3$

A 2-liter flask fitted with a thermocouple, overhead stirrer, dropping funnel and heating mantle was charged with $C_4F_9SO_2F$ (543 g, 1.80 mole). To this stirred material was slowly added a mixture of hexylamine (194.0 g, 1.90 mole) and triethylamine (194.0 g, 1.90 mole); the ensuing mixture was stirred and heated at 65° C. for 2 hours. Water (555.0 g) was then added, and stirred for an additional 30 minutes. The lower phase was separated, put into a flask and heated to 60° C. To this heated mixture was added sulfuric acid (50 g concentrated sulfuric and 500 g water). The lower phase of the resulting two-phase mixture was then separated, washed with water (500 g), and placed in a flask with a one-plate distillation head. The flask was heated to 80° C. at 20-25 mm Hg (2.7-3.3 kPa) and the distillate collected over a period of one hour. The material that remained in the flask was further distilled at 8 mm Hg (0.4 kPa) and a pot temperature of 138-143° C., yielding $C_4F_9SO_2NH(CH_2)_5CH_3$ (561.0 g). NMR and GC/MS analyses were consistent with the indicated material.

Preparation of $C_4F_9SO_2N((CH_2)_5CH_3)CH_2CH(OH)CH_2SO_3NH_4$ (GS-1)

A two-liter round bottom flask fitted with a thermocouple, overhead stirrer and reflux condenser was charged with 132 g of $C_4F_9SO_2NH(CH_2)_5CH_3$ (0.344 mole) and heated to 50° C. Upon complete liquefaction of $C_4F_9SO_2NH(CH_2)_5CH_3$ under stirring, 18.8 g of LiOH, 41 g of deionized water and 41 g of butoxypropanol were added, and the mixture was heated to 93° C. for about 1.5 hour. Chlorohydroxypropanesulfonate sodium salt (93 g) was added and the mixture was stirred overnight at about 93° C. A Dean-Stark trap was fitted to the flask and 352 g of deionized water was added. The temperature was elevated to 97° C. and the butoxypropanol/water azeotrope was stripped from the mixture (approximately 500 mL). The flask was cooled to room temperature, and 500 g of deionized water was added and then a further 500 mL of material was further removed at 97° C. using the Dean Stark trap. The mixture was cooled to room temperature and 1000 g of deionized water was added. An additional 500 g of material was stripped from the mixture via the Dean Stark trap. The ensuing mixture was cooled to 80° C. and 325 g of deionized water and 200 g sulfuric acid was added and stirred for one hour. The mixture was cooled to 50° C., and 458 g of methyl t-butyl ether was added and the mixture was stirred for 30 minutes. The upper ether layer was removed from the aqueous lower layer using a separatory funnel, and the ether layer was successively washed with two charges of 18 g of sulfuric acid diluted in 300 mL water. Under stirring, 47 g ammonium hydroxide (30 percent aqueous) was added and the ether layer was removed from the aqueous layer using a separatory funnel and successively washed with 60 mL ammonium carbonate (3 percent) followed by three charges of 60 mL of ammonium bicarbonate (3 percent). The resulting ether solution was poured into a tray and dried at 90° C., yielding $C_4F_9SO_2N((CH_2)_5CH_3)CH_2CH(OH)CH_2SO_3NH_4$ (166 g). The solid was analyzed by NMR and showed this material to be 97.7 percent pure with 2.5 percent unreacted hexyl amide, and unreacted 0.1 percent chlorohydroxypropanesulfonate sodium salt.

Preparation of $C_4F_9SO_2NHCH_2CH_2CH_3$

A 3-necked round bottom flask fitted with a condenser, an overhead stirrer, thermocouple and an addition funnel was charged with $C_4F_9SO_2F$ (100.0 g; 0.33 mole). n-Propylamine (40.0 g; 0.678 mole) was added at a rate such that the temperature did not exceed 55° C. over a period of 30 minutes. The mixture was refluxed as 72° C. for 2 hours. Deionized water (300 mL) was then added, maintaining the temperature above 60° C. The batch was stirred for about 15 minutes; then, the upper aqueous phase was removed. The resulting solids were washed with sulfuric acid solution (300 mL), then with deionized water (300 mL). A viscous yellow liquid was isolated and characterized as $C_4F_9SO_2NHCH_2CH_2CH_3$ (99.0 g).

Preparation of $C_4F_9SO_2N(CH_2CH_2CH_3)CH_2CH_2CH_2SO_3Li$ (GS-2)

A 500 mL round bottom flask equipped with a condenser, heating mantle, thermocouple and stirrer was charged with $C_4F_9SO_2NH(CH_2CH_2CH_3)$ (15.635 g, 0.04585 moles), $LiOH.H_2O$ (2.104 g; 0.05014 moles) and methyl tert-butyl ether (150 mL). The ensuing mixture was refluxed, with stirring for 1.5 hours. Upon cooling to room temperature, the reaction mixture was filtered and the clear, colorless filtrate was combined with 1,3-propane sultone (6.124 g; 0.05014 moles) and heated to about 55° C. for 3.0 hours. Upon cooling the mixture to room temperature, hexanes (150 mL) were added, with stirring, causing a white, gummy, semisolid precipitate to form. From this mixture, the solvent was decanted and hexanes (150 mL) were added. Agitation for a few days at room temperature caused the product to further crystallize to the point where it could be broken up into a suspension of solid particles. The suspension was filtered by suction and the solid product was washed with two portions of hexane and partially dried by suction. Further drying was accomplished in a vacuum oven at 50° C. and $10^{-2}$ torr (1 Pa) overnight. A total of 16.9 g of product (78.6 percent yield) was recovered as a white, free-flowing powder. LC-MS analysis indicated that this material was 87 percent $C_4F_9SO_2N(CH_2CH_2CH_3)CH_2CH_2CH_2SO_3^-$, with the bulk of the remainder consisting of $C_4F_9SO_2N(CH_2CH_2CH_3)CH_2CH_2CH_2SO_3CH_2CH_2CH_2SO_3^-$ (9.6 percent) and $C_4F_9SO_2N(CH_2CH_2CH_3)CH_2CH_2CH_2SO_3CH_2CH_2CH_2SO_3CH_2CH_2CH_2SO_3^-$ (1.6 percent).

Preparation of $C_4F_9SO_2NH((CH_2)_7CH_3)$

The preparation of $C_4F_9SO_2NH((CH_2)_7CH_3)$ essentially followed the procedure described for the Preparation of $C_4F_9SO_2NH((CH_2)_5CH_3)$, with the exception that an equimolar amount of octylamine was substituted for hexylamine.

Preparation of $C_4F_9SO_2N((CH_2)_7CH_3)CH_2CH(OH)CH_2SO_3H$

A one-liter round bottom flask fitted with a thermocouple, overhead stirrer and reflux condenser was charged with 126 grams (g) of $C_4F_9SO_2N((CH_2)_7CH_3)H$ (0.344 mole) and heated to 50° C. Upon complete liquefaction of the $C_4F_9SO_2N((CH_2)_7CH_3)H$ under stirring, 16.7 g of LiOH, 37 g deionized water and 37 g of butoxypropanol were added and the mixture was heated to 93° C. After about 1.5 hours, 83 g of chlorohydroxypropanesulfonate sodium salt was added, and the mixture was stirred overnight at about 93° C. A Dean-Stark trap was fitted to the flask, and 352 g of deionized water was added. The temperature was elevated to 97° C. and the butoxypropanol/water azeotrope was stripped from the mixture (approximately 500 mL). The flask was cooled to room temperature, and 500 g of deionized water was added and 500 mL was further removed at 97° C. using the Dean Stark trap. The mixture was cooled to room temperature and 1000 g of deionized water was added. An additional 500 g of material was stripped from the mixture via the Dean Stark trap. The ensuing mixture was cooled to 80° C. and 325 g of deionized water and 200 g sulfuric acid was added and stirred for one hour. The mixture was cooled to 50° C. and 458 g of methyl tert-butyl ether was added and stirred for 30 minutes. The upper ether layer was removed from the aqueous lower layer using a separatory funnel, and the ether layer was successively washed with two charges of 18 g of sulfuric acid diluted in 300 mL water. The resulting ether solution was poured into a tray, and dried at 90° C. yielding $C_4F_9SO_2N((CH_2)_7CH_3)CH_2CH(OH)CH_2SO_3H$ (126 g). The solid was analyzed by NMR, which was consistent with a mixture of 93 percent $C_4F_9SO_2N((CH_2)_7CH_3)CH_2CH(OH)CH_2SO_3H$ and 7 percent unreacted octyl amide.

Preparation of $C_4F_9SO_2N((CH_2)_7CH_3CH_2CH(OH)CH_2SO_3Li$ (GS-3)

A 500-mL round bottom flask equipped with an overhead stirrer was charged with 70 g of $C_4F_9SO_2N(C_8H_{17})CH_2CH(OH)CH_2SO_3H$, 60 g water and 70 g dipropylene glycol methyl ether. The mixture was slurried together using overhead stirring. Lithium carbonate (3.7 g) was added and the flask was heated at 44° C. After 30 minutes the pH was tested and found to be 3. The remaining 3.7 g of lithium carbonate was added in aliquots 0.5-1 g at a time to the batch until the pH tested 9. Methyl tert-butyl ether (200 mL) was added and the upper organic phase was separated from the lower aqueous phase. The upper phase was dried over the weekend to give 85 g of paste. Dipropylene glycol methyl ether (75 g) was added to dissolve the paste. The resulting solution was filtered. Evaporation of 2.2 g of the filtered solution at 100° C. for 3 hours gave 0.33 g of a solid. NMR analysis of the solid was consistent with $C_4F_9SO_2N((CH_2)_7CH_3)CH_2CH(OH)CH_2SO_3Li$.

Evaluation of Surface Tension and Leveling in Floor Finish Composition

Surface Tension

All products were diluted to the indicated concentration using deionized water. Static surface tension was measured using a Kiruss K-12 tensiometer (obtained from Kruss GmbH, Hamburg, Germany) and the Du Nouy ring method at 20° C. Dynamic surface tensions were measured at the same concentration using a maximum bubble pressure tensiometer available under the trade designation "SENSADYNE 5000"

from Data Physics Instruments, Germany, using a bubble speed of 4 bubbles/second at 20° C.

Examples 1-2 and Comparative Example C1

An aqueous styrene-acrylic emulsion floor finish was obtained from Cook Composites and Polymers, Kansas City, Mo., that was identical to that marketed by Cook Composites and Polymers under the trade designation "SHIELD-8"; except that the fluorinated surfactant (available under the trade designation "ZONYL FSN" from E. I. du Pont de Nemours & Co., Wilmington, Del.) and the hydrosol emulsion leveler (available under the trade designation "ESI-CRYL 842" from Cook Composites and Polymers) were omitted. Samples of this floor finish (i.e., FF1) were prepared for testing by addition of 200 parts per million by weight (i.e., ppm) of the fluorinated surfactant to be evaluated.

Five mL of the liquid floor finish, containing either 100 or 200 ppm of fluorinated surfactant was applied to the center of a 12"×12" (30 cm×30 cm) pre-cleaned black vinyl composite floor tile, then spread using a with a piece of gauze or cheesecloth covering the entire surface area of the tile until an even coating was obtained. The coating was applied using figure eight-shaped strokes covering the entire surface area of the tile until an even coating was obtained. An "X" was then made by wiping the floor finish between diagonally opposed corners of the tile. The process was repeated until a total of five layers of coating had been applied, allowing each coating layer to dry for at least 25-30 minutes prior to reapplication.

The floor tiles were coated with five courses of floor finish and the coated tiles were allowed to air dry for at least 7 days, then 60° gloss was measured using a BYK-Gardner gloss meter available under the trade designation "MICRO-TRI-GLOSS METER" from Paul N. Gardner Co., Inc., Pompano Beach, Fla., as taking the average of six different measurements over the coated surface of the tile. Properties of floor finishes with various fluorinated surfactants are reported Table 3.

Wetting Test (0-5 Rating)

Wetting performance was determined by visually inspecting the coating of floor finish for surface defects during and after drying of final coat. Poor wetting is generally manifested as surface defects in the form of craters, pinholes, and the coating pulling in from the edges of the tile. Wetting performance values were determined according to the system shown in Table 1 (below):

TABLE 1

| OBSERVATION | RATING |
| --- | --- |
| Complete de-wetting of the coating. Coating is mainly concentrated in small pools. | 0 |
| Extreme de-wetting. Only small areas of continuous coating. | 1 |
| Mainly continuous coating, however, coating has numerous craters and/or pinholes. Pronounced pulling from the edges. | 2 |
| Few but obvious craters and/or pinholes in coating. | 3 |
| Very few pinholes are small craters; small lower gloss areas. | 4 |
| No observation of craters, pinholes, or coating pulling in from the edge. Wet coating remains smooth during dry down. Even gloss over entire surface. | 5 |

Leveling Test (0-5 Rating)

Leveling performance was determined by visual inspection of the floor finish coating during and after drying of the final coat. Poor leveling can be determined through observation of figure eight strokes and the "X" applied during the coating process. The coating can appear uneven or have channels from application strokes. Leveling was evaluated using the criteria shown in Table 2 (below):

TABLE 2

| OBSERVATION | RATING |
| --- | --- |
| Deep channels or grooves in the X and figure eight pattern. | 0 |
| Observation of X and all figure eight patterns; uneven thickness of coating | 1 |
| Though the coating may appear smooth, can observe X and all figure eight patterns | 2 |
| Obvious observation of X and some figure eight patterns. | 3 |
| Faint observation of X and little to no figure eight patterns. | 4 |
| No observation of X or figure eights at any angle. | 5 |

TABLE 3

| EXAMPLE | FLUORINATED SURFACTANT, (ppm) | WETTING TEST, (0–5 RATING) | LEVELING TEST, (0–5 RATING) | 60° GLOSS |
| --- | --- | --- | --- | --- |
| 1 | GS-1 (200) | 4 | 3 | 55 |
| 2 | GS-3 (200) | 3 | 4 | 54 |
| 3 | GS-1 (100) | 4 | 3 | 59 |
| 4 | GS-3 (100) | 4 | 4 | 58 |
| Comparative Example C-1 | GS-2 (200) | 1 | 1 | 61 |

Surfactant performance in General Purpose, Waterborne Acrylic, Wood Coating Resin A waterborne wood coating resin was prepared to evaluate surfactant performance. Acrylic base resin and other ingredients were formulated into Neoresins' recommended WB-4041 starting point formulation as follows: 100 parts by weight (pbw) all-acrylic base resin available under the trade designation "NEOCRYL A-6092" from DSM Neoresins (Wilmington, Mass.), 20 pbw water, 1 pbw ammonium hydroxide, 1.1 pbw trialkyl phosphate available under the trade designation "KRONITEX KP-140" from Great Lakes Chemical Corp. (Indianapolis, Ind.), 13 pbw ethylene glycol ether available under the trade designation "CARBITOL" from Union Carbide (Danbury, Conn.), and 0.34 pbw defoamer available under the trade designation "RHODOLINE COLLOID 770" from Rhodia (Cranbury, N.J.).

Once a stock solution of the starting point formulation was prepared, samples were taken and blended with 2,500 ppm of experimental surfactant (based on solids) for testing. The surfactant of this invention was pre-diluted to 25 percent by weight in ethylene glycol ether available under the trade designation "CARBITOL" from Union Carbide prior to adding to the aqueous starting point formulation with stirring.

The following procedure was used for evaluation of leveling, wetting, surface tension, and gloss of the surfactant in a waterborne acrylic wood coating resin.

Using a foam brush, an even coating of the formulation to be tested was applied to a maple plywood panel, and allowed to dry for at least 8 hours. A total of three coats were applied using this procedure. The first coat was lightly sanded with 150-200 grit sandpaper. After the third coat was dry, the coating was evaluated for craters and pinholes (dewetting problems), brush marks and striations (leveling problems), and gloss. The panels were rated for wetting and leveling, and 60° gloss were determined using the test methods described above, and are reported in Table 4 (below).

TABLE 4

| EXAMPLE | SURFACTANT | WETTING TEST (0–5 RATING) | LEVELING TEST (0–5 RATING) | 60° GLOSS |
|---|---|---|---|---|
| 5 | GS-3 | 4 | 5 | 65 |
| 6 | GS-1 | 3 | 4 | 66 |
| C-2 | GS-2 | 0 | 3 | 60 |

Various modifications and alterations of this invention may be made by those skilled in the art without departing from the scope and spirit of this invention, and it should be understood that this invention is not to be unduly limited to the illustrative embodiments set forth herein.

What is claimed is:

1. A coatable composition comprising: water, a film-forming organic polymer, and a leveling agent comprising an anionic species represented by the formula

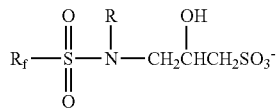

wherein $R_f$ represents a perfluoroalkyl group having from 4 to 6 carbon atoms, and R represents H or an alkyl group having from 1 to 18 carbon atoms.

2. A coatable composition according to claim 1, wherein the organic polymer comprises at least one of an emulsified polymer or a polymer latex.

3. A coatable composition according to claim 1, wherein the organic polymer comprises acrylic polymer.

4. A coatable composition according to claim 1, wherein the organic polymer comprises polyurethane.

5. A coatable composition according to claim 1, wherein R represents an alkyl group having from 1 to 8 carbon atoms.

6. A coatable composition according to claim 1, wherein R represents an alkyl group having from 6 to 8 carbon atoms.

7. A coatable composition according to claim 1, further comprising wax.

8. A coatable composition according to claim 7, further comprising a metal complexing agent.

9. A coatable composition according to claim 1, further comprising at least one crosslinking agent for the organic polymer.

10. A coatable composition according to claim 9, wherein the at least one crosslinking agent comprises at least one polyvalent metal cation selected from the group consisting of $Ca^{2+}$, $Mg^{2+}$, $Zn^{2+}$, $Zr^{4+}$, and $Al^{3+}$ cations.

11. A coatable composition according to claim 1, further comprising pigment.

* * * * *